Figure 1:
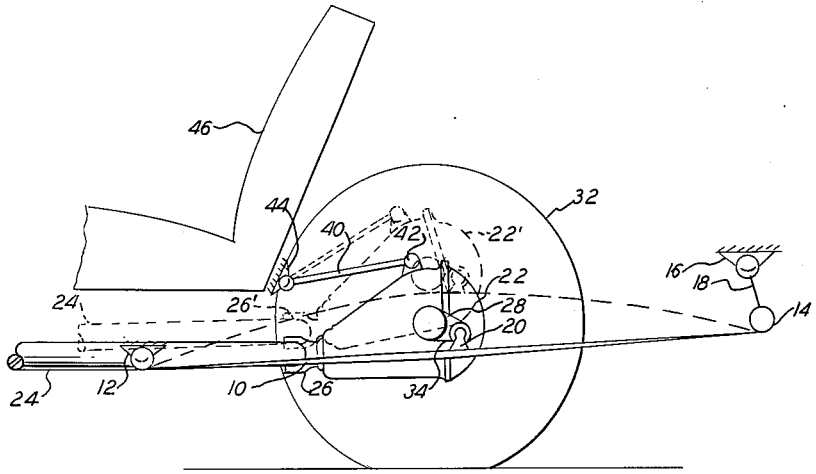

ALFRED RIST
INVENTOR

# United States Patent Office 3,213,959
Patented Oct. 26, 1965

3,213,959
LEAF SPRING VEHICLE SUSPENSION HAVING A PIVOTAL CONNECTION BETWEEN THE LEAF SPRING AND THE WHEEL SUPPORT
Alfred Rist, Cologne-Weidenpesch, Germany, assignor to Ford Motor Company, Dearborn, Mich., a corporation of Delaware
Filed May 4, 1964, Ser. No. 364,476
1 Claim. (Cl. 180—73)

The present invention relates generally to motor vehicle suspension systems, and more particularly to an unique leaf spring suspension.

In the conventional vehicle having leaf type suspension springs, the springs are rigidly secured to the axle housing. The torque reaction from braking and acceleration tends to distort the leaf springs from their semi-elliptical configuration into the shape of an S. This is called axle windup.

Normally, the leaf spring is connected to the chassis at one of its ends by a fixed eye and at the other of its ends by a shackle. The eye and shackle connections are loaded approximately equally by the weight of the sprung mass which the springs and unsprung components support. The torque reaction during acceleration of the vehicle reduces the loading of the front connection of the spring while simultaneously increasing the loading at the rear connection. Brake torque produces the opposite result by adding to the load of the front spring connection while unloading the rear.

The tendency to windup is undesirable for at least two reasons. First, the springs are not symmetrically loaded which is unfavorable to their spring life. Second, it is necessary to design the springs so that they are husky enough to carry the acceleration and braking torque as well as the sprung mass of the vehicle. In addition to being uneconomical, this compromises the optimum spring configuration for the best ride characteristics. For an example, a spring that could provide a soft ride might not be acceptable if, in addition, it had to carry the bending moment produced by torque reaction.

In view of these limitations of prior vehicle suspension systems, separate means are provided in accordance with the present invention to carry the acceleration and braking torques so that the leaf springs need support only the weight of the sprung mass.

In accordance with the presently preferred embodiment of this invention, the axle housing is connected to the leaf spring by a pivot rather than the usual rigid connection and an upper link is provided between the vehicle frame and the differential or axle housing. Not only does this arrangement permit improvements in design of the leaf springs, but it also provides the further advantage of improving road holding qualities of the vehicle. The height of the drive shaft tunnel may be reduced because the vertical travel of the drive shaft and differential during jounce is more closely controlled. The improvements in roadability result in part from the fact that the suspension may be designed to have anti-lift during hard braking and anti-squat during acceleration.

Figure 2:
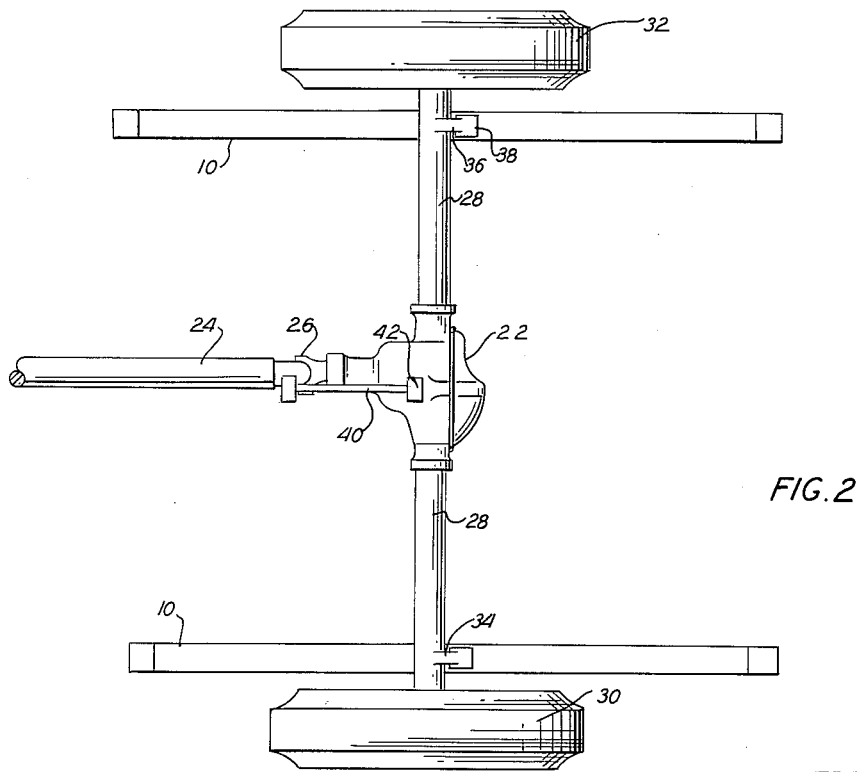

The many objects and advantages of the present invention will become apparent from the following discussion when considered in conjunction with the accompanying drawings in which:

FIGURE 1 is a side elevational view in diagrammatic form of a vehicle suspension incorporating the present invention; and FIGURE 2 is a top plan view of the vehicle suspension of FIGURE 1.

Referring now to FIGURE 1 for a more complete understanding of the invention, a vehicle suspension having a leaf spring 10 is disclosed. The spring 10 is connected by a resilient bushing to a frame mounted bracket 12 at its forward end. A spring eye 14 is formed at its rear end. Spring eye 14 is connected to a rear frame bracket 16 by a shackle 18 of conventional construction. A spring bracket 20 is rigidly secured to the spring 10 at approximately its midpoint.

The vehicle includes a differential gear unit 22 which receives power from a drive shaft assembly 24 that includes a universal joint 26. Left and right portions of an axle housing 28 extend laterally from the differential gear unit 22. Driving axles are journalled within the axle housing 28 and are drivingly connected to left and right road wheels 30 and 32. A bracket 34 is welded to the left axle housing portion 28 and extends downwardly and rearwardly therefrom. Axle bracket 34 is pivotally connected to the spring bracket 20. Similarly on the right-hand side, axle bracket 36 extends downwardly and rearwardly from the axle housing 28 and is pivotally connected to a spring bracket 38.

An upper suspension link 40 has its rear end pivotally connected at 42 to the differential gear unit 22. It extends downwardly and forwardly from the pivot 42 and has its forward end pivotally connected to a frame mounted pivot bracket 44.

A vehicle seat 46 is disclosed in FIGURE 1 to illustrate the general arrangement and location of the components.

Because the leaf springs 10 are connected to the axle housing portions 28 by pivot devices, braking and accelerating torque which cause the springs to be distorted into the shape of an S (axle windup) cannot be transferred from the axle housing 28. These forces are carried by the upper link 40 operating in conjunction with the suspension leaf springs 10. Braking and accelerating merely load the springs 10 in tension or compression rather than imposing a bending moment. Such loads are easily accommodated.

During jounce movements, the differential 22 will move to the position 22' and the universal joint 26 will move to the location 26'. The paths of the differential 22 and joint 26 are controlled by the upper link 40 and the leaf springs 10. It will be noted that the forward extension of the differential traverses a substantially shorter vertical displacement during jounce movement than occurs with heretofore conventional leaf spring suspensions. This permits the height of the tunnel under the seat 46 to be lower.

In addition, the link 40 and springs 10 may be inclined with respect to the horizontal to provide desired anti-squat and anti-lift properties to the suspension.

Modifications and alterations of this invention may occur to those skilled in the art that will come within the scope and spirit of the following claim.

I claim:

A vehicle suspension system having a frame, a pair of driving wheels, an axle housing means interconnecting said driving wheels, a longitudinally extending leaf spring disposed adjacent each of said wheels, said springs being connected to said frame, a bracket extending downwardly and rearwardly from said axle housing means adjacent each of said wheels, said bracket being pivotally connected to said spring by means having a transverse pivot axis, a longitudinally extending link pivotally connected to said axle housing means and extending downwardly and forwardly therefrom, the forward end of said link being pivotally connected to said frame.

References Cited by the Examiner

UNITED STATES PATENTS

| | | | |
|---|---|---|---|
| 2,226,047 | 12/40 | Borgward | 180—73 |
| 2,300,844 | 11/42 | Olley | 267—66 X |
| 2,323,007 | 6/43 | Borgward | 267—66 |
| 2,919,760 | 1/60 | Fehlberg | 267—66 X |

FOREIGN PATENTS 898,808  6/62  Great Britain.

BENJAMIN HERSH, *Primary Examiner.*

A. HARRY LEVY, *Examiner.*